Sept. 6, 1938.  C. BACHMANN  2,129,257
PROCESS OF MAKING THRUST ROLLERS FOR FLUID METERS
Filed Jan. 15, 1936
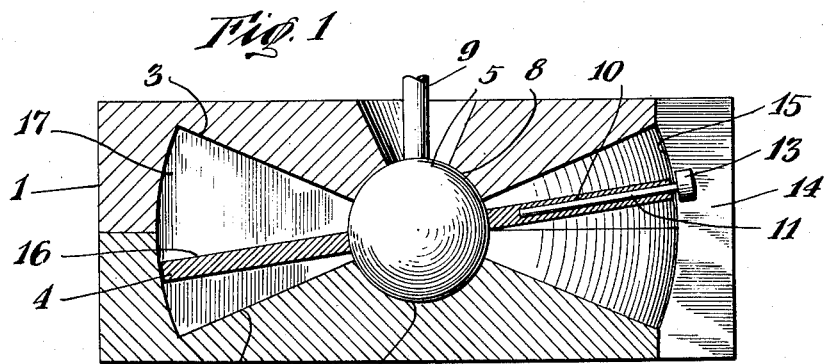
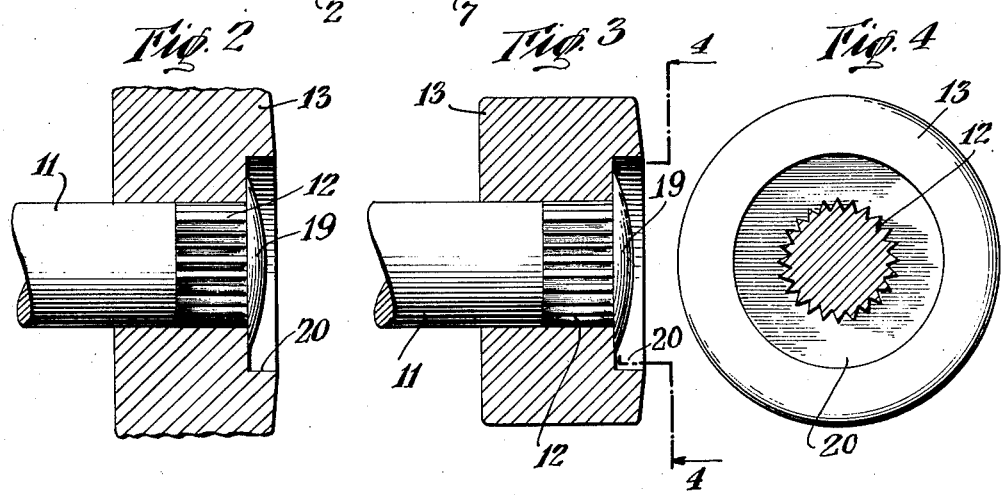
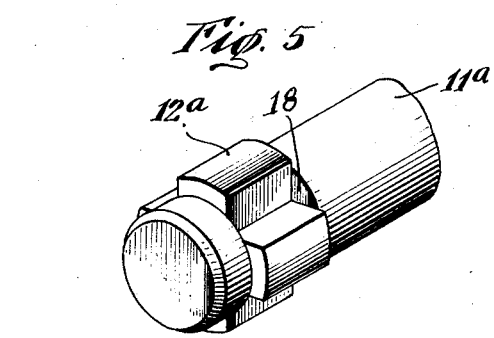
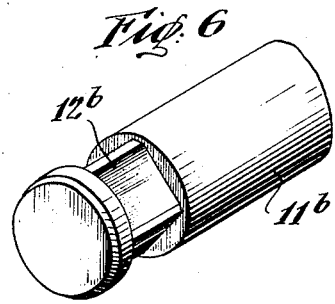
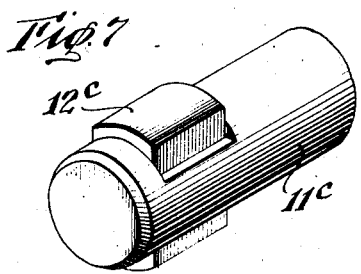
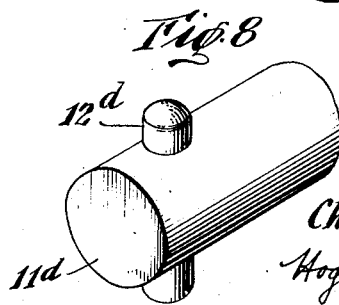
INVENTOR
Charles Bachmann
BY
ATTORNEY Patented Sept. 6, 1938

2,129,257

UNITED STATES PATENT OFFICE 2,129,257

PROCESS OF MAKING THRUST ROLLERS FOR FLUID METERS

Charles Bachmann, Jackson Heights, N. Y., assignor to Neptune Meter Company, a corporation of New Jersey Application January 15, 1936, Serial No. 59,180

3 Claims. (Cl. 29—148)

My invention relates to improvements in thrust roller construction in small water meters of the nutating disc type.

It has been common practice in the meter art, as shown by the patents to Marden No. 1,857,851, and Gamon, No. 856,244, to provide the nutating disc of a meter with a roller which bears against a thrust plate to reduce wear on the partition and on the edges of the disc. The patent to Gamon discloses, in addition, that these rollers have been made of hard rubber to reduce shock in the meter and wear on the thrust plate.

In the small type of meter, such as the 1½ inch and smaller size, the disc chamber is so constricted in area that the roller size must of necessity be very small. Due to this small size of roller, and consequent thin shell of rubber, it was found that the shell shattered after very short service and was entirely unsatisfactory, so that, as constructed heretofore, the rubber roller could only be used in large meters providing sufficient space to enable it to be made sufficiently heavy to withstand the wear and load to which it is subjected in use.

The small type of meter, therefore, has been constructed with a metal roller heretofore, which has the disadvantage that the roller causes excessive wear of the thrust plate and denting thereof, which ultimately results in uneven movement of the nutating disc and excessive vibration of the whole meter.

In accordance with the present invention, a hard rubber thrust roller especially adapted for use in nutating disc meters is provided, the roller overcoming the disadvantages of the usual metal roller with regard to shock and wear on the thrust plate and being of such construction that it can be made light and thin for small meter use without being subject to shattering and consequent shortness of operating life.

For a more complete understanding of the invention, reference may be had to the accompanying drawing, in which:

Figure 1 is a transverse section through a conventional form of nutating disc type of water meter embodying the invention;

Figure 2 is an enlarged axial section through the novel roller in one stage of manufacture;

Figure 3 is an enlarged axial section of a finished roller;

Figure 4 is a face view of the roller as seen along line 4—4 of Figure 3;

Figures 5, 6, 7 and 8 are perspective views of spindles having different forms of head portions suitably shaped to receive the roller.

As shown in Figure 1 of the drawing, the meter consists of the usual housing 1 having therein opposed substantially frusto-conical walls 2 and 3 which act as guiding and bearing surfaces for a nutating disc or piston 4. The disc 4 is mounted upon a ball pivot 5 which is supported in hemispherical bearings 7 and 8. The ball has projecting therefrom, a shaft 9 which actuates the usual register (not shown).

In the periphery of the disc 4 is a radially disposed bore, 10, receiving rotatably a spindle 11. The outer end, 12, of the spindle is provided with a hard rubber roller, 13, rigidly secured thereto in a novel manner. This roller bears against a thrust plate, 14, mounted in the arcuate wall, 15, of the housing 1.

The disc is further provided with a radial slot, 16, which receives closely a partition, 17, also mounted in the walls, 2, 3 and 15. The disc is movable with respect to the partition to permit the disc to nutate or wabble on passage of the water to effect a metering of the volume of water passed, in a known manner.

The roller 13 and thrust plate serve their usual function of preventing wear on the partition 17 and the edge of the disc. The rubber roller 13 also serves to reduce the shocks and vibrations incidental to the operation of the disc.

The novel process of forming the rubber roller on the spindle, includes providing the spindle 11 with a roughened or irregular or non-circular end portion, such as is shown at 12, 12a, 12b, 12c or 12d in Figures 2 to 8. The spindle 11 disclosed in Figures 2 to 4 is provided with a longitudinally grooved or serrated end portion 12 having a swaged-over outer end.

The spindle 11a disclosed in Figure 5 is cut away or stamped to form transverse shoulders 18 and circumferentially spaced portions 12a extending beyond the periphery of the spindle 11a, said portions together defining a cross-shaped portion with the intersecting portions of the arms of the cross disposed within the periphery of the spindle.

Spindle 11b disclosed in Figure 6 is provided with a substantially square shouldered polygonal portion 12b spaced inwardly of the end of the spindle 11 and of smaller cross sectional dimensions than the body of the spindle.

Spindle 11c disclosed in Figure 7 is provided with extending projections 12c of generally rectangular cross-section forming a key-shape with the spindle 11c.

The spindle 11d disclosed in Figure 8 is similar to that disclosed in Figure 7 except that the projections 12d are circular in cross section and resemble a cylindrical pin passing through and projecting beyond the periphery of the spindle 11d. It is to be noted that these spindle ends, whether longitudinally grooved are serrated, as shown at 12, cross-shaped as shown at 12a, polygonal as shown at 12b or key-shaped as shown at 12c and 12d, are provided with both longitudinal and transverse shoulders, which prevent both axial and rotary movement of the rubber roller 13, relatively to the spindle 11, 11a, 11b, 11c or 11d, as the case may be.

The blank for the roller 13 is a tube section or annulus of vulcanized hard rubber, larger in outside diameter than the intended final size of the roller, and having an inside diameter approximately the diameter of the spindle 11. This rubber annulus is heated to a sufficiently high temperature to soften and expand it. The expanded annulus is then drawn over the irregular end 12, 12a, 12b, 12c or 12d, as the case may be, of the spindle, and cooled. Cooling causes a shrinkage of the annulus onto the spindle and forces the rubber into very tight and intimate contact with all of the surfaces of the irregular spaced end portion of the spindle. When the rubber has hardened, the extreme end portion of the spindle may be swaged down and expanded as at 19 to retain more securely the annulus against endwise movement. As shown in Figures 2 and 3, the annulus may be provided with a recess 20 to receive the expanded end of the spindle.

The roller is then reduced to the desired shape and size shown in Figures 3 and 4, by a suitable machining operation, as for example by cutting, grinding or an equivalent material removing operation. The machining operation enables the production of great accuracy in the dimensions of the roller.

It has been found, in actual use, that even for extended periods of time, this hard rubber roller 13 will not loosen from its tight and interengaging contact with the spindle. Such rollers are now being used in small meters, to replace the metal rollers formerly used, and have been found to be superior to the metal rollers in both wear-resistance and improvement in the operation of the meter, due to reduction of shock and vibration.

While certain preferred embodiments of the invention have been illustrated and described herein, it is to be understood that the invention is not limited thereby but is susceptible of changes in form and detail within its scope. For example, although hard rubber is preferred as a material for the roller, other initially plastic material having similar properties such as a phenolic resin and the like, may be employed with equal facility, and the term "hard rubber" as used in the claims comprehends such equivalents.

I claim:

1. The process of forming a thrust roller assembly for fluid meters, which comprises providing a metal spindle with a serrated surface portion adjacent one end heating a hard rubber annulus to expand it, shrinking it on a surface portion, and then machining the annulus to the desired form.

2. The process of forming a thrust roller assembly for fluid meters, which comprises forming a spindle with an irregular surface portion adjacent one end, shrinking a hard rubber annulus on the said surface portion, thereafter shaping the annulus to the desired form and swaging down a projecting end portion of the spindle to lock the annulus against endwise movement.

3. A process of forming a thrust roller assembly for fluid meters comprising forming a non-circular end portion on a spindle, heating a hard rubber annulus to expand it, drawing the expanded annulus over the non-circular end of the spindle, cooling the expanded annulus to cause it to shrink tightly on to said non-circular portion, and then machining the cold annulus to the desired size and shape.

CHAS. BACHMANN.